Jan. 10, 1956 — W. E. MARTIN — 2,730,376
ATTACHABLE HITCHING UNIT FOR TRUCKS
Filed Aug. 14, 1951 — 3 Sheets-Sheet 1
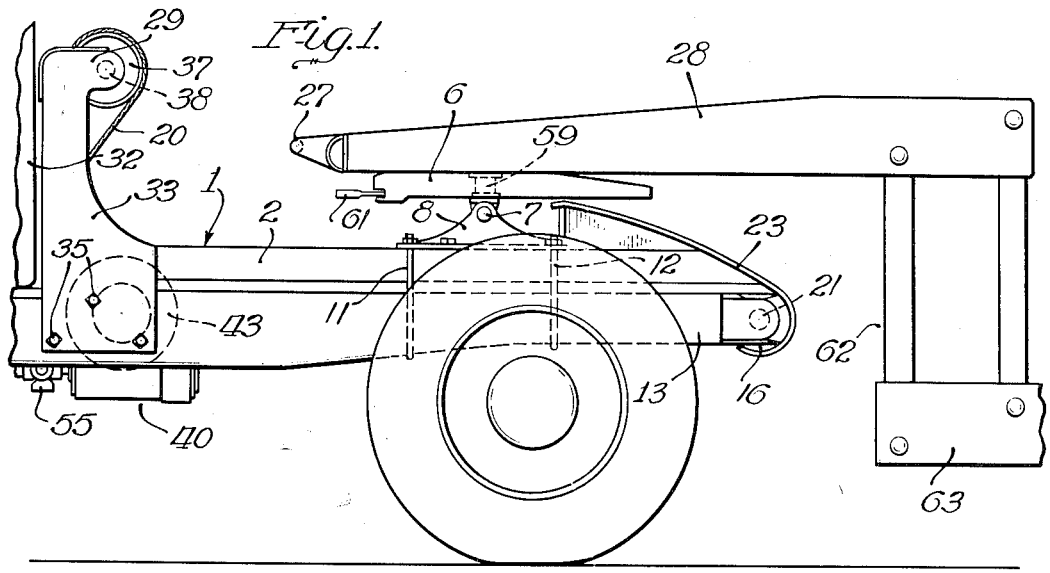
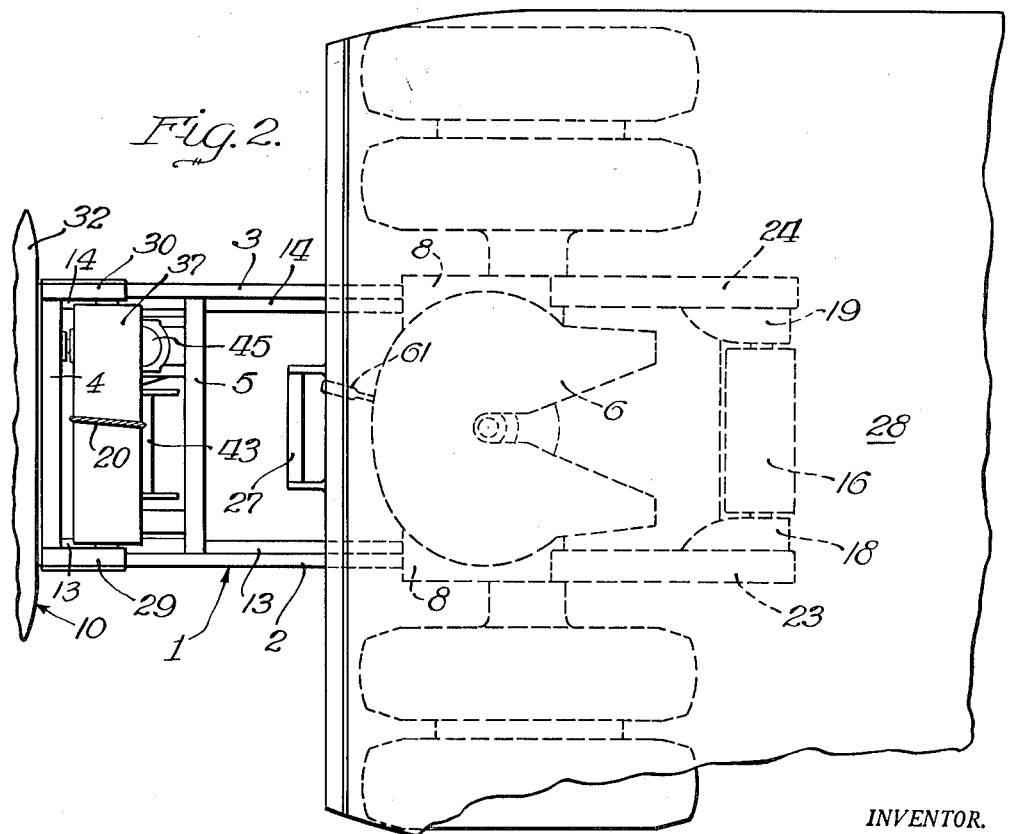
INVENTOR.
William E. Martin
BY
Eberhard E. Wettley
Atty.

INVENTOR.
William E. Martin

United States Patent Office 2,730,376
Patented Jan. 10, 1956

2,730,376

ATTACHABLE HITCHING UNIT FOR TRUCKS

William E. Martin, Kewanee, Ill.

Application August 14, 1951, Serial No. 241,712

16 Claims. (Cl. 280—425)

This invention relates to an attachable unit for handling hitch pin trailer tongues and to provide a hitching means for connecting a trailer tongue with a towing vehicle.

More specifically, this invention is directed to a self-contained unit that may be mounted upon a short chassis truck and wherein a cable winch is disposed between the frame members of a chassis, this unit also incorporating a fifth wheel as a hitching device which fifth wheel is located above the level of the winch so that the latter will not interfere with the clearance necessary to accommodate the tongue of a trailing vehicle.

A standard tractor comprising a truck equipped for towing trailing vehicles and having the necessary cable and winch mechanisms is a very expensive unit as such. Smaller companies or individuals in the hauling business are considerably handicapped unless they do have a tractor that can be used in their operations.

It is one of the objects of the present invention to provide a completely assembled and self-contained unit which incorporates the necessary mechanisms such as a fifth wheel and a cable and cable winch, and which assembly can be bodily attached to the chassis of a standard truck, thus considerably reducing the price of such a unit as a tractor over a standard construction of towing vehicle.

The present hitching unit and associated mechanisms need not be confined for use upon a chassis of a truck and can be mounted on other portions of a standard vehicle without much difficulty.

It is another object of the present invention to provide an assembly of this character that is designed to produce as much clearance as possible by the particular arrangement of the mechanisms that are incorporated into this unit.

Another object of the present invention is to provide the cable mechanism with guiding arrangements that permit placing the winch considerably below the operating level of the bearing plate of the fifth wheel and preferably between the frame members of the assembled unit and the truck chassis, the construction generally including cable guiding arrangements which will suspend the cable above the fifth wheel to be free and clear of the latter while such cable is in use and connected with a trailing vehicle tongue.

The overhead suspension of the cable for clearing the fifth wheel will considerably reduce wear and tear on the cable as well as on the fifth wheel, thus providing an open clearance condition which will permit free operation of the cable while attaching or lowering a trailing vehicle tongue. It is still a further object of the present invention to include power take-off means which can be connected with the power mechanism of the truck so that the winch can be conveniently driven for operating the cable.

Other objects and advantages relating to the unit for handling hitch pin trailer tongues and the like comprising the structure of the present invention shall hereinafter appear in the following detailed description having reference to the accompanying drawings that form a part of this specification.

In the drawings:

Fig. 1 is a side elevational view of a pair of connected vehicles with the towing vehicle incorporating the assembled unit comprising the present invention;

Fig. 2 is a plan view of the general arrangement illustrated in Fig. 1;

Figure 3:
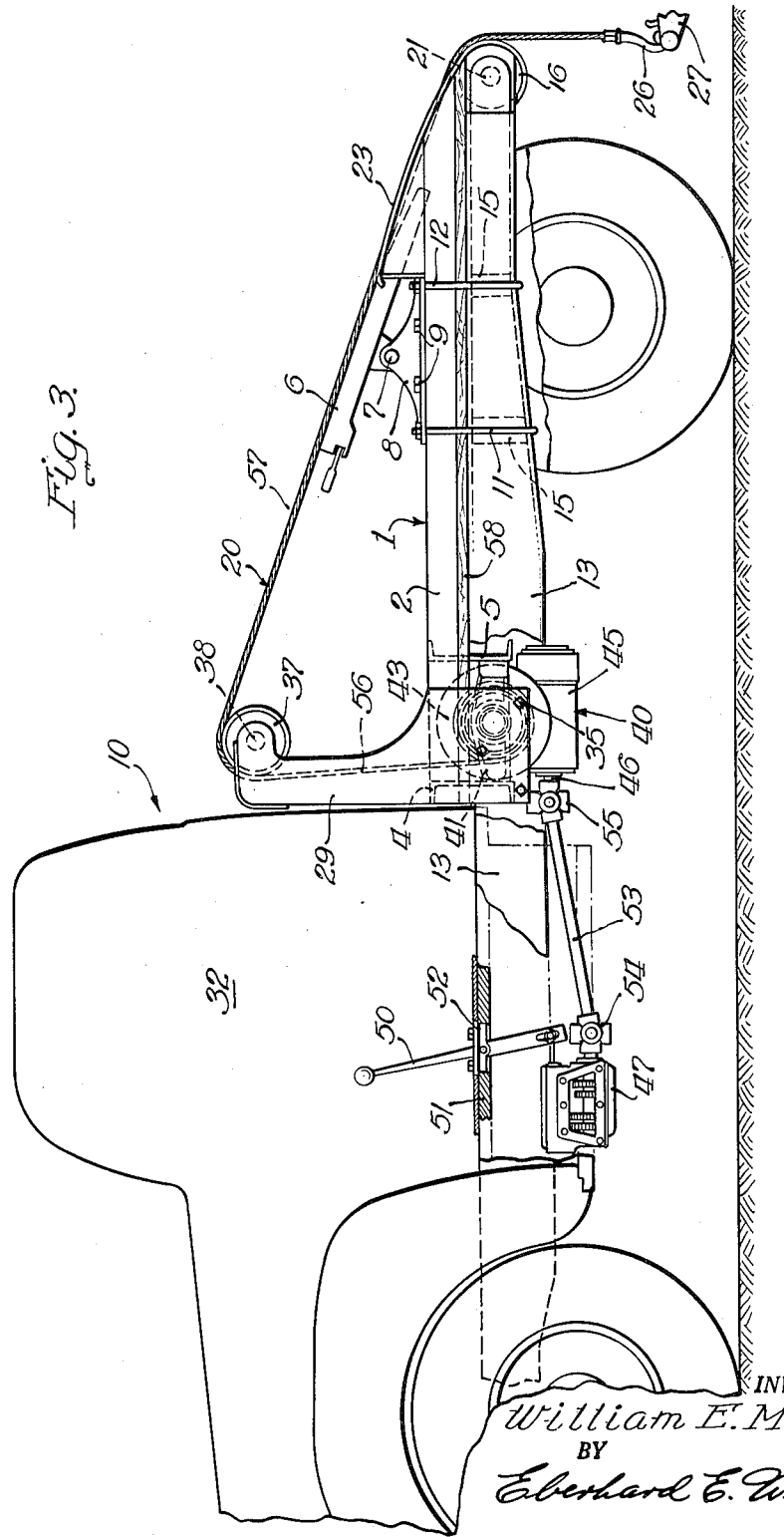
Figure 4:
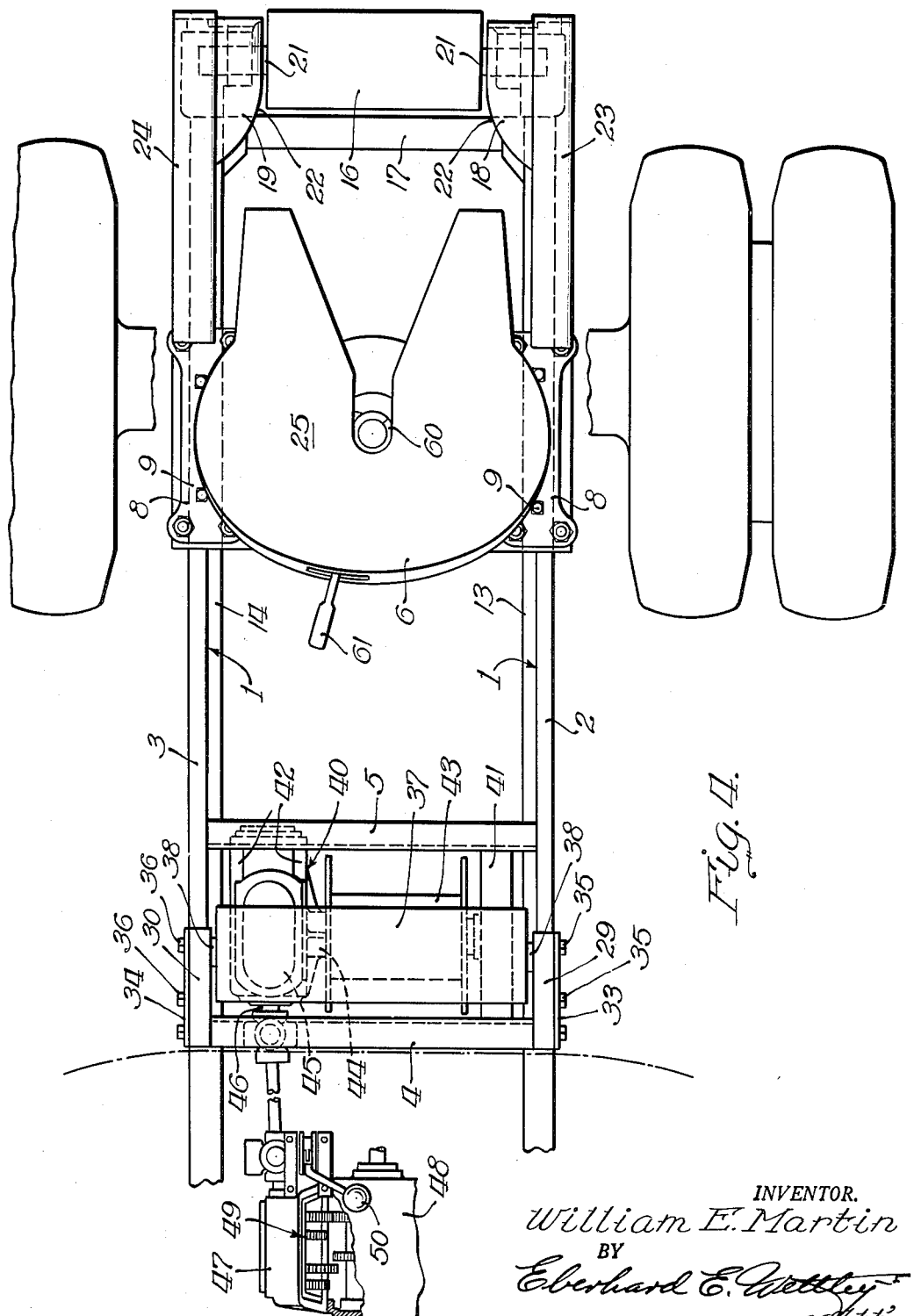

Fig. 3 is a side elevational view of the attachable hitching unit of this invention as the same appears when mounted upon a truck of standard construction, this figure including the power take-off arrangement used for driving the cable winch; and Fig. 4 is a plan view of the combination truck and hitching unit in their assembled form to better illustrate further details of construction of the invention.

As best illustrated in Figs. 3 and 4, the assembled unit comprises a frame 1 forming a base for the entire unitary arrangement of hitching device. This frame 1 is preferably constructed as an open framework having longitudinal beams 2 and 3 connected by cross beams such as 4 and 5 and with other suitably positioned cross members if desired. A fifth wheel 6 is pivotally carried upon stub shafts 7 that are journalled in bearings 8 which are preferably secured at 9 to the longitudinal beams 2 and 3 so that the fifth wheel 6 will occupy a given position lengthwise of the frame 1, this position being preferably forward of the rear axle of the truck 10 as shown in Fig. 3. The bearings 8 are further secured to the frame 1 by means of U bolts such as 11 and 12 which are made to straddle the longitudinal members 2 and 3 of the frame 1 and also the side frames 13 and 14 of the truck chassis. Suitable blocks 15 are interposed between the flanges of the side frames of the truck chassis to reenforce the frames against the vertical pull of the U bolts 11 and 12 when securing the base frame 1 to the chassis. Obviously, the longitudinal beams 2 and 3 are further secured by the latter described fastening means and through the fifth wheel structure that extends between the bearings.

The rear portion of the frame 1 pivotally supports a tail roller 16 in outboard fashion beyond the end frame 17 of the chassis truck, the roller 16 overhanging the tail portion of the chassis as best illustrated in Fig. 3. A pair of cable guards 18 and 19 are interposed between the side portions of frame 1 and the roller 16 to normally maintain the cable 20 from dropping off of the roller upon the roller shaft 21 and associated parts, the forward portions 22 of the guards being rounded as illustrated in Fig. 4 to further maintain the cable in guided position upon the roller 16. The guards 18 and 19 are angularly disposed and substantially contiguous with the rails 23 and 24 forming tongue guides that are rigidly supported upon the longitudinal beams 2 and 3 of the frame 1. These guides angle upwardly from adjacent a tangential point of the roller 16 and assume substantially the same angular position as the bearing plate 25 of the fifth wheel 6 when the latter is disposed in inoperative position as illustrated in Figs. 3 and 4. Thus the rails 23 and 24 serve to protect the roller 16 and the adjacent portions of the fifth wheel 6 when the cable 20 is being utilized through a suitable hook 26 to lift the forward hook bar 27 of a tongue 28 and to direct the latter toward the fifth wheel for a coupling.

The structure described comprising the roller 16, the cable guards 18 and 19 and the rails 23 and 24 are all secured to the frame 1 as a unitary assembly bodily movable with the frame so that this entire arrangement can be properly secured to a truck chassis to provide an auxiliary tail structure for the truck which is adapted for conveniently handling the hitching elements of a trailing vehicle while connecting the latter to a fifth wheel or disconnecting the same therefrom.

The forward portion of frame 1 includes a pair of brackets 29 and 30 that are disposed at the extreme forward edge of the frame 1 and are relatively narrow fore and aft for disposition immediately adjacent the cab 32 of the truck 10 so as to provide as much clearance space as possible between the brackets 29 and 30 and the fifth wheel structure. Each of the brackets includes side plates 33 and 34 that are secured to the longitudinal beams 2 and 3 of the frame 1 and these plates straddle the laterally outward sides of the side frames 13 and 14 of the chassis to be secured by means of the bolts 35 and 26 thereto.

The brackets 29 and 30 pivotally support a cable roller 37 on suitable shafts 38 and in a position immediately adjacent the cab 32 and considerably above the top level of the base frame 1.

A winch mechanism 40 is suitably carried upon members or channels 41 and 42 which form a portion of the base frame 1. The winch mechanism includes a cable drum 43 that is pivoted upon the channel 41 and a bearing 44 comprising a portion of the speed change mechanism 45 of the winch. The latter has a drive shaft 46 extending therefrom for connection with a suitable power take-off means 47 that is arranged to receive motive power from the truck engine through suitable means such as the transmission 48 indicated in Fig. 4. The power take-off means 47 includes suitable gearing 49 and a shift control lever 50 which can be secured into the floorboards 51 of the truck as at 52 so that the manipulation of the control lever 50 will provide a forward and reverse speed from the power take-off means as well as a neutral position. The power is transmitted between the power take-off means 47 and the speed change mechanism 45 by means of a shaft 53 connected through universal 54 with the power take-off means 47 and by a universal 55 with the drive shaft 46 of such speed change mechanism.

The drum 43 is adapted to receive the end of the cable 20 which is fixed to the drum and the cable is trained upwardly as at 56 to pass over the roller 37 which provides an upper guide means for the cable to establish a suspended diagonal run thereof as at 57 between the roller 37 and the tail roller 16. This diagonal disposition of the cable at 57 avoids lateral contact of the cable with any of the fifth wheel or other hitching parts, and the cable can move laterally in the general plane of the upper face or surface of the inoperative and tilted fifth wheel bearing plate as best illustrated in Fig. 3.

Attention is further directed to the fact that the entire winch mechanism is nested within the base frame 1 and depends into the space between the side frames 13 and 14 of the chassis, thus disposing the entire winch unit in a position to provide the maximum clearance above the frame 1 for free and unobstructed handling of the hitching structure of a trailing vehicle.

It should also be noted that suitable cushion pads comprising strips of wood such as 58, as seen in Fig. 3, are interposed between the bottom portion of the frame 1 and the upper surface of the channel frames 13 and 14 to facilitate fastening the entire auxiliary hitching unit upon the chassis of a truck. The wood cushion pads will conform to any irregularities in the frame members and will also enhance the securement of the U bolts such as 11 and 12 by the inherent resiliency of such pads. This will normally tend to keep the fastenings tight.

Figs. 1 and 2 illustrate how a trailing tongue such as 28 will be positioned upon the fifth wheel 6, such tongue having the usual form of hitch pin 59 that is adapted to be received by the fifth wheel latching mechanism 60 as illustrated in Fig. 4, the fifth wheel also having a latch release lever 61 for the normal release of the hitch pin when separation of the vehicles is desired. Obviously, any type of trailing vehicle may be hooked on to the fifth wheel 6, but the illustrations shown in Figs. 1 and 2 relate to a trailing vehicle comprising a machinery hauling trailer having a foldable gooseneck arrangement 62 which swingably supports the tongue 28 from the forward end of the trailer bed 63. A structure of this type requires the cable mechanism to lift the tongue 28 off of the ground and to bring the same upwardly over the guide rails 23 and 24 toward the fifth wheel 6 and into latching position thereon. The cable 20 is also used in reversing the operation when disconnecting the vehicles and for other analogous uses.

The entire base frame and all of its associated parts comprises a unitary structure that can be bodily applied to any standard form of truck chassis, and the same may be transferred from one truck to another if desirable. However, this unit for handling trailing vehicle hitching structures and for connecting the same to the chassis of a conventional truck thus provides a means for converting a standard truck into a tractor unit without entailing the expense that would be necessary if such an entire unit was purchased to perform the function of a tractor only.

The above description relates to a preferred embodiment of the invention as disclosed in the drawings, but it is contemplated that certain changes may be made in the exact design, the shapes of the parts and the combination of parts without departing from the fundamental concept of the present invention. Such changes shall be governed by the breadth and scope of the appended claims.

What I claim is:

1. A unit for handling hitch pin trailer tongues comprising, in combination, a framework base, a fifth wheel supported upon said framework base to receive a hitch pin of a trailer tongue, a cable for attachment with the tongue, a cable winch carried by said framework base in a position below the level of said fifth wheel and forwardly thereof, and cable guiding members supported by said framework base in locations fore and aft of said fifth wheel to normally suspend said cable free and clear of the fifth wheel while the cable is operatively connected with a trailer tongue.

2. A unit for handling hitch pin trailer tongues comprising, in combination, a framework base, a fifth wheel supported upon said framework base to receive a hitch pin of a trailer tongue, a cable for attachment with the tongue, a cable winch carried by said framework base in a position below the level of said fifth wheel and forwardly thereof, and cable guiding members supported by said framework base in locations fore and aft of said fifth wheel to normally suspend said cable free and clear of the fifth wheel while the cable is operatively connected with a trailer tongue, said frame and its associated mechanisms comprising a complete assembly arranged for bodily attachment with the chassis of a power operated vehicle, and said cable winch having power take-off means connected therewith and positioned below the vehicle chassis to obtain motive power from said power operated vehicle.

3. A unit for handling hitch pin trailer tongues comprising, in combination, a framework base, a fifth wheel supported upon said framework base to receive a hitch pin of a trailer tongue, a cable for attachment with the tongue, a cable winch carried by said framework base in a position below the level of said fifth wheel and horizontally spaced therefrom, and cable guiding means connected with said framework base comprising a first roller mounted upon the base in elevated position above said cable winch, and a second roller mounted on said base in aft position with respect to the fifth wheel to dispose the cable in an inclined suspended relation free and clear of said fifth wheel while said cable is operatively connected with a trailer tongue.

4. A unit for handling hitch pin trailer tongues comprising, in combination, a framework base, a fifth wheel supported upon said framework base to receive a hitch pin of a trailer tongue, a cable for attachment with the tongue, a cable winch carried by said framework base in a position below the level of said fifth wheel and horizontally spaced therefrom, and cable guiding means connected with said framework base comprising a first roller mounted upon the base in elevated position above said cable winch, and a second roller mounted on said base in aft position with respect to the fifth wheel to dispose the cable in an inclined suspended relation free and clear of said fifth wheel while said cable is operatively connected with a trailer tongue, said framework base including tongue guides thereon adjacent said fifth wheel and the aft cable guide roller to protect the fifth wheel and roller, and to properly direct the tongue over the framework base to the fifth wheel under the action of the winch operated cable.

5. A unit for handling hitch pin trailer tongues comprising, in combination, a framework base, a fifth wheel supported upon said base to receive the hitch pin of a trailer tongue, a cable for attachment with the tongue, a cable winch carried by said base in a position beneath the level of said fifth wheel and horizontally spaced therefrom, tongue guiding members on said base, and cable guiding rollers on said base, said rollers being carried by said base in vertically spaced locations fore and aft of the fifth wheel to suspend the cable at a like inclination to the tilt of the fifth wheel when the latter is in inoperative tongue hitch pin receiving position, and said tongue guiding members being arranged adjacent said fifth wheel and inclined as said inoperative fifth wheel to properly direct a trailer tongue to the fifth wheel under the action of the inclined winch operated cable.

6. A unit for handling hitch pin trailer tongues comprising, in combination, a framework base, a fifth wheel supported upon said base to receive the hitch pin of a trailer tongue, a cable for attachment with the tongue, a cable winch carried by said base in a position beneath the level of said fifth wheel and horizontally spaced therefrom, tongue guiding members on said base, and cable guiding rollers on said base, said rollers being carried by said base in vertically spaced locations fore and aft of the fifth wheel to suspend the cable at a like inclination to the tilt of the fifth wheel when the latter is in inoperative tongue hitch pin receiving position, and said tongue guiding members being arranged adjacent said fifth wheel and inclined as said inoperative fifth wheel to properly direct a trailer tongue to the fifth wheel under the action of the inclined winch operated cable, said base and its associated mechanisms comprising a complete assembly arranged for bodily attachment with the chassis of a power operated vehicle.

7. A unit for handling hitch pin trailer tongues comprising, in combination, a framework base, a fifth wheel supported upon said base to receive the hitch pin of a trailer tongue, a cable for attachment with the tongue, a cable winch carried by said base in a position beneath the level of said fifth wheel and horizontally spaced therefrom, tongue guiding members on said base, and cable guiding rollers on said base, said rollers being carried by said base in vertically spaced locations fore and aft of the fifth wheel to suspend the cable at a like inclination to the tilt of the fifth wheel when the latter is in inoperative tongue hitch pin receiving position, and said tongue guiding members being arranged adjacent said fifth wheel and inclined as said inoperative fifth wheel to properly direct a trailer tongue to the fifth wheel under the action of the inclined winch operated cable, said base and its associated mechanisms comprising a complete assembly arranged for bodily attachment with the chassis of a power operated vehicle, and power take-off means connected to drive said winch including a driving connection for obtaining motive power from said power operated vehicle.

8. A unit for hitching a trailing vehicle to a truck chassis comprising a base frame for mounting upon the truck chassis, a fifth wheel carried upon said base frame, fastening means to secure said fifth wheel upon said base frame, certain of said fastening means being adapted to secure said base frame to said chassis, and cooperative mechanisms carried upon said base frame for attachment with a trailing vehicle to direct said vehicle into hitching connection with said fifth wheel, said cooperative mechanisms comprising a cable, a cable winch, and guide rollers for said cable, said rollers being arranged to suspend said cable free and clear of the base frame parts and associated mechanisms, and one of said rollers being mounted in outboard relation upon said base frame for disposition beyond the truck chassis to dispose the free end of said cable in operative position for connection with a trailing vehicle.

9. A unit for hitching a trailing vehicle to a truck chassis comprising a base frame for mounting upon the truck chassis, a vehicle hitching device carried upon said base frame, fastening means to secure said vehicle hitching device upon said base frame, certain of said fastening means being adapted to secure said base frame to said chassis, and cooperative mechanisms carried upon said base frame for attachment with a trailing vehicle to direct said vehicle into hitching connection with said vehicle hitching device, said cooperative mechanisms comprising a cable, a cable winch, and guide rollers for said cable, said rollers being arranged to suspend said cable free and clear of the base frame parts and associated mechanisms, and one of said rollers being mounted in outboard relation upon said base frame for disposition beyond the truck chassis to dispose the free end of said cable in operative position for connection with a trailing vehicle.

10. A unit for connecting a trailing vehicle in towing relation with a pulling vehicle comprising a base, a fifth wheel carried upon said base, and cable mechanism on said base for connection with the trailing vehicle to move the latter into engagement with said fifth wheel, fastening means to secure said base upon the structure of the pulling vehicle, cushion pads of deformable material connected with said base and arranged to engage and conform with the adjacent structural surfaces of the pulling vehicle, and spaced depending structural members carried by said base and arranged to straddle fixed structural portions of said pulling vehicle to stabilize the base against relative movement with respect to the pulling vehicle.

11. The combination with a conventional wheeled power truck having a cab and a chassis extending rearwardly therefrom, of an attachable unit for securing a trailing vehicle to said truck chassis to the rear of said cab, said unit comprising a base, a fifth wheel thereon, and cable equipment for coacting with said fifth wheel in hitching the trailing vehicle thereto, said cable equipment comprising a cable winch positioned in a location below the clearance area for the trailing vehicle behind the truck cab, and cable guiding means disposed immediately adjacent the truck cab and beneath the end of the truck chassis respectively to provide optimum clearance conditions adjacent said fifth wheel and above the truck chassis for a hitched trailing vehicle.

12. A conversion unit to transform a conventional vehicle into a tractor type vehicle with towing means for receiving a hitch member of a trailing vehicle and wherein said conventional vehicle includes a driver's cab and a mobile body structure, said conversion unit comprising an independent framework, fastening means to bodily secure said framework upon said body structure, a hitch on said framework for connection with the hitch member of said trailing vehicle, and a cable winch device carried by said framework and provided with a cable means for handling the hitch member of the trailing vehicle to make and unmake the towing connection between the vehicles, said cable winch device comprising a narrow fore and aft mechanism located at one end of said framework for disposition immediately adjacent the driver's cab and constructed and arranged to suspend said cable winch below the top level of said framework to provide adequate clearance for said hitch member forwardly of the location of said hitch position on said framework.

13. A conversion unit to transform a conventional vehicle into a tractor type vehicle with towing means for receiving a hitch member of a trailing vehicle and wherein said conventional vehicle includes a driver's cab, a chassis, and a wheeled carriage for said chassis with the top of the wheels thereof extending above the plane of said chassis, said conversion unit comprising an independent framework having a base for surface attachment with the top of the chassis and between said wheels, said base overhanging the rear end of said chassis, a hitch on said framework for towing connection with the hitch member of said trailing vehicle, said hitch being arranged over said chassis and above the upper extremities of said carriage wheels, and cooperative guide means supported upon said framework rearwardly of the location of said hitch and extending from a position behind the rear end of the framework base and below the top levels of the wheels to a position above said wheels and adjacent said framework hitch to guide the attaching end of said trailing vehicle hitch member over the chassis and wheels into a position above said chassis and framework base for connection with said framework hitch upon relative motion between said vehicles.

14. A conversion unit to transform a conventional vehicle into a tractor type vehicle with towing means for receiving a hitch member of a trailing vehicle and wherein said conventional vehicle includes a driver's cab, a chassis, and a wheeled carriage for said chassis with the top of the wheels thereof extending above the plane of said chassis, said conversion unit comprising an independent framework for attachment to the chassis and between said wheels, a hitch on said framework for towing connection with the hitch member of said trailing vehicle, said hitch being arranged over said chassis and above the upper extremities of said carriage wheels, and cooperative guide means supported upon said framework rearwardly of the location of said hitch and extending from a position behind and below the top levels of the wheels to a position above said wheels and adjacent said framework hitch to guide the attaching end of said trailing vehicle hitch member over the wheels into a position for connection with said framework hitch upon relative motion of said vehicles, said cooperative guide means comprising a roller mounted at the rearward end of said framework, and guide rails extending from adjacent said roller to a location adjacent said framework hitch.

15. A conversion unit to transform a conventional vehicle into a tractor type vehicle with towing means for receiving a hitch member of a trailing vehicle and wherein said conventional vehicle includes a driver's cab, and a mobile body structure, said conversion unit comprising an independent framework, fastening means to bodily secure said framework upon said body structure, a hitch on said framework for connection with the hitch member of said trailing vehicle, and a cable winch device carried by said framework, and a cable for said device to manipulate the attaching end of said hitch member of the trailing vehicle to make or unmake the towing connection between said vehicles, and cooperative cable positioning means mounted upon said independent framework in spaced positions fore and aft of said framework hitch, said positioning means occupying vertical locations to suspend the run of said cable therebetween in a predetermined clearance location with respect to said hitch on said framework.

16. A conversion unit to transform a conventional vehicle into a tractor type vehicle with towing means for receiving a hitch member of a trailing vehicle and wherein said conventional vehicle includes a driver's cab, and a mobile body structure, said conversion unit comprising an independent framework, fastening means to bodily secure said framework upon said body structure, a hitch on said framework for connection with the hitch member of said trailing vehicle, and a cable winch device carried by said framework, and a cable for said device to manipulate the attaching end of said hitch member of the trailing vehicle to make or unmake the towing connection between said vehicles, and cooperative cable positioning means mounted upon said independent framework in spaced positions fore and aft of said framework hitch, said positioning means occupying vertical locations to suspend the run of said cable therebetween in a predetermined clearance location with respect to said hitch on said framework, and guide means carried adjacent said hitch and arranged to receive said trailing vehicle hitch member thereover under the operative action of said cable and whereby said hitch member is guided toward said hitch with said hitch member simultaneously guiding the attached end of said cable in a given relation with respect to said hitch.

References Cited in the file of this patent

UNITED STATES PATENTS

| | | |
|---|---|---|
| 1,479,980 | Cadman et al. | Jan. 8, 1924 |
| 2,325,869 | Mosling | Aug. 3, 1943 |
| 2,489,112 | Talbert | Nov. 22, 1949 |
| 2,515,833 | Mueller | July 18, 1950 |
| 2,580,501 | Anderson et al. | Jan. 1, 1952 |
| 2,604,219 | Alvare | July 22, 1952 |